United States Patent
Yoganand et al.

(10) Patent No.: US 10,764,156 B2
(45) Date of Patent: Sep. 1, 2020

(54) ISSUE COMMUNICATION TECHNIQUES

(71) Applicant: ServiceNow, Inc., Santa Clara, CA (US)

(72) Inventors: Prithvi Yoganand, Dublin, CA (US); Rajesh Swaminathan, Union City, CA (US); Udom Dwivedi, Los Altos, CA (US)

(73) Assignee: ServiceNow, Inc., Santa Clara, CA (US)

( * ) Notice: Subject to any disclaimer, the term of this patent is extended or adjusted under 35 U.S.C. 154(b) by 28 days.

(21) Appl. No.: 15/953,111

(22) Filed: Apr. 13, 2018

(65) Prior Publication Data

US 2019/0319856 A1     Oct. 17, 2019

(51) Int. Cl.
*H04L 12/24*     (2006.01)
*G06F 3/0482*    (2013.01)
*H04L 29/08*     (2006.01)

(52) U.S. Cl.
CPC ............ *H04L 41/22* (2013.01); *G06F 3/0482* (2013.01); *H04L 67/10* (2013.01)

(58) Field of Classification Search
CPC .............................. G06F 3/0482; H04L 41/22
USPC ......................................................... 715/735
See application file for complete search history.

(56) References Cited

U.S. PATENT DOCUMENTS

| | | | |
|---|---|---|---|
| 8,285,752 B1* | 10/2012 | Golan | G06F 16/217 707/802 |
| 10,505,825 B1* | 12/2019 | Bettaiah | G06F 16/285 |
| 10,515,096 B1* | 12/2019 | Choudhary | G06F 3/04847 |
| 10,536,353 B2* | 1/2020 | Gupta | G06F 16/951 |
| 2013/0113822 A1* | 5/2013 | Putrevu | H04L 12/282 345/619 |
| 2016/0364215 A1* | 12/2016 | Brachetti | G06F 3/0482 |
| 2016/0366036 A1* | 12/2016 | Gupta | H04L 67/16 |
| 2017/0046127 A1* | 2/2017 | Fletcher | G06F 3/04817 |
| 2017/0046374 A1* | 2/2017 | Fletcher | G06F 3/0484 |
| 2017/0126689 A1* | 5/2017 | Lloyd | G06F 3/04817 |
| 2017/0171034 A1* | 6/2017 | Lucas | H04L 41/145 |
| 2017/0201850 A1* | 7/2017 | Raleigh | H04W 4/50 |
| 2017/0237630 A1* | 8/2017 | Halmstad | H04L 41/22 715/735 |
| 2019/0116256 A1* | 4/2019 | Rahman | H04M 1/72569 |

* cited by examiner

*Primary Examiner* — William D Titcomb
(74) *Attorney, Agent, or Firm* — Fletcher Yoder PC

(57) ABSTRACT

Provided are communication management techniques useful for delivering communications to client instances that have been impacted by a particular issue. The communication management techniques include determining an issue that impacts two or more client instances, generating and presenting a communications management graphical user interface (GUI), and sending communications to each client instance in response to a selection of a selectable communication action. The communications management GUI may include a communications portion configured to perform a selectable communication action related to the issue that impacts two or more client instances, and the selectable communication action may be configurable to send one or more communications to each client instance.

19 Claims, 13 Drawing Sheets

| 6 IMPACTED CUSTOMERS | | | | |
|---|---|---|---|---|
| NUMBER | ACCOUNT NUMBER | PRIMARY CONTACT | PHONE | |
| | | | | |
| | | | | |
| | | | | |
| | | | | |
| VIEW ALL | | | | |

| 6 CHILD CASES | | | | |
|---|---|---|---|---|
| NUMBER | SHORT DESCRIPTION | ACCOUNT | CONTACT | ASSIGNED TO |
| CS0000001 | LOREM IPSUM DOLOR SIT AMET | BOXEO | JAMES DOE | ABEL TUTER |
| CS0000002 | LOREM IPSUM DOLOR SIT AMET | AVID CORP | JANE JOHNSON | ABEL TUTER |
| CS0000003 | LOREM IPSUM DOLOR SIT AMET | TOMTOM NET | JIMMY JONES | ABEL TUTER |
| CS0000004 | DOLOR SIT AMET | ELEGANT COMM | JOAN JACOBS | NED STARK |
| CS0000005 | DOLOR SIT AMET LOREM IPSUM | UNITY | JACOB SMITH | SARAH HIGGINS |
| VIEW ALL | | | | |

| 4 IMPACTED ASSETS | | | |
|---|---|---|---|
| SERIAL NUMBER | ASSET NUMBER | MODEL CATEGORY | ACCOUNT |
| | | | |
| | | | |
| | | | |

| 4 IMPACTED CIs | | | |
|---|---|---|---|
| CI NUMBER | CI CLASS | BUSINESS CRITICALITY | OPERATIONAL STATUS |
| | | | |
| | | | |
| | | | |

FIG. 8

ADD COMMUNICATION TASK

422 — *COMMUNICATION PLAN [NEW ▾]
424 — *PLAN NAME [EXECUTIVE TEAM COMMUNICATION]
426 — ADD RECIPIENTS [USER ▾] [JOHN DOE 🔍] [ADD]
428 — *RECIPIENT LIST [JOHN DOE ✕]
430 — *TASK NAME [EXECUTIVE TEAM STATUS UPDATES]
432 — TASK DESCRIPTION [SEND THIS NOTIFICATION UPDATE TO ALL BUSINESS STAKEHOLDERS EVERY 30 MINUTES TO KEEP THEM UPDATED ON THO W THE INCIDENTS PROGRESS.]
384 — *CHANNELS ☐ EMAIL
              ☐ PUBLICATION
              ☐ CASE
              ☐ ANNOUNCEMENTS
436 — FREQUENCY ○ ONE TIME
              ○ RECURRING
              [30] MINUTES

[CANCEL] [SAVE]

RECIPIENTS LIST
NEW RECORD

*NAME [                    ]
TYPE [INTERNAL USERS ▼]      STATE [NEW]

SETUP
  METHOD [DYNAMIC CONDITION ▼]  — 490
  SHOW SCRIPT ☐  — 492
  TABLE [USER [SYS_USER]]
  USER FIELD [CLICK TO SELECT...]  — 494
  CONDITIONS [ADD FILTER CONDITION] [ADD "OR" CLAUSE]
             [-CHOOSE FIELD-▼] [-OPER-] [-VALUE-]  — 496

[SUBMIT]

FIG. 13

ISSUE COMMUNICATION TECHNIQUES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to issue communication tools. In particular, the current disclosure relates to issue communication tools for facilitating communications between service operators and clients impacted by a common issue.

Individuals, enterprises, and other organizations may utilize software resources, via multiple devices connected to a network, to conduct activities or otherwise run an organization. Set up, expansion, maintenance, and normal use of such systems may give rise to issues that a client may not have the expertise to resolve on his or her own. For example, service outages or other service disruptions may involve issues that require resolution for continued and/or optimal operation of a client. In such cases, an operator, such as a customer service agent, may facilitate quick and efficient resolution of the issue. Additionally, an operator must communicate with a client to keep them up-to-date on the occurrence and resolution state of an issue.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques generally relate to systems and techniques implemented to facilitate communication with regard to an issue that impacts two or more client instances. Disclosed herein is a communications management graphical user interface that presents a service agent with a variety of communication tools which may facilitate various means of communication with one or more client instances. In particular, the communications management graphical user interface may include one or more selectable communication options configured to send one or more communications to each client instance impacted by an issue. The communications management user interface may also be configured to dynamically create and/or update a recipient list for each issue that impacts two or more client instances.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 8 is an embodiment of another portion of the unified issue management window of FIG. 5 when the summary feature of FIG. 7 is selected, in accordance with aspects of the present approach;

FIG. 10 is an embodiment of a portion of the unified issue management window of FIG. 5, whereby a communication task is added to the communications feature of FIG. 9, in accordance with aspects of the present approach;

FIG. 13 is an embodiment of the unified issue management window of FIG. 5, whereby a recipient list of an issue may be created, in accordance with aspects of the present approach.

DETAILED DESCRIPTION OF SPECIFIC EMBODIMENTS

Figure 1:
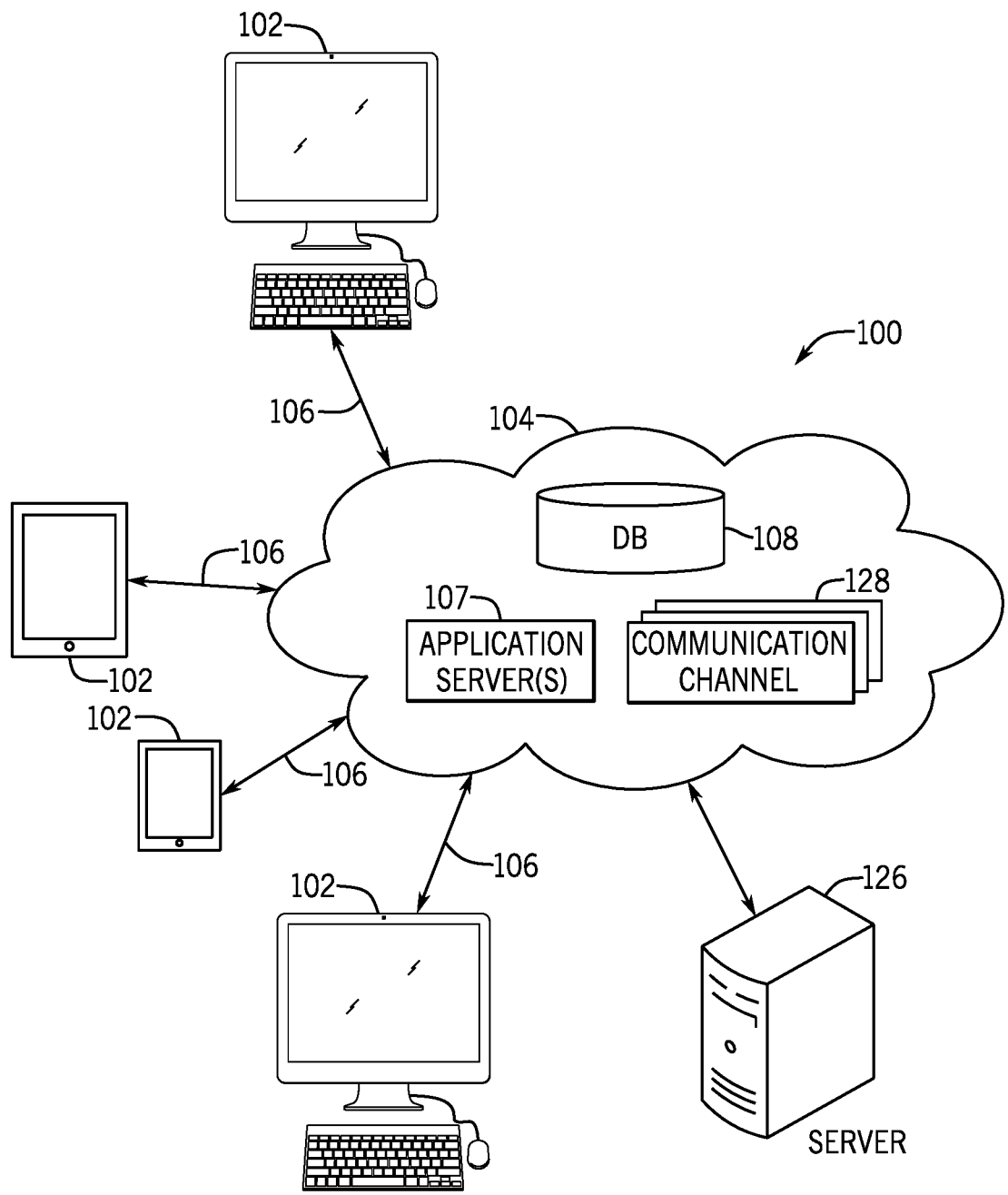
FIG. 1 is a block diagram of an embodiment of a distributed computing system utilizing a platform and a database (DB), in accordance with aspects of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and organization-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Information Technology (IT) is becoming increasingly important as enterprises and other organizations utilize computers and implement software to conduct their operations. Set up, expansion, maintenance, and normal use of such systems may give rise to issues that an organization may not have the expertise and/or personnel to resolve on its own. For example, these issues may include an unplanned crash of a data center, planned down time at a data center to provide an update or system maintenance, or a software or network communication defect. Until such issues are remedied, such as by one or more service agents or engineers, service outages may persist and often may affect the operations of more than one organization or other party.

For example, in the context of a multi-instance architecture, different clients may each be provided with their own separate instance or instances within the architecture. However, the instances may have hardware, facilities, and/or infrastructure that are shared at some level. For example, two organizations may utilize the same or separate instances that rely upon services of the same data center provider. As a result, both parties may be affected when the data center of the provider crashes, or when some other shared infrastructure is unavailable, out of service, malfunctions, and so forth. Such outage or unavailability of a resource may be characterized as an issue herein. Once an issue occurs, it is important for the operator to efficiently communicate the occurrence of the issue and any resolution updates to each organization or each party impacted by the issue.

Typically, a customer service agent (e.g., operator) creates a separate case for each customer (e.g. organization or other party) impacted by a particular issue. The customer service agent must resolve each case independently as well as separately communicate information to each customer about the occurrence of the issue and any updates to the resolution process of the issue. This process continues until each case for each customer impacted by the issue is resolved. Additionally, resolving an issue and administering communications with regard to an issue may involve the utilization of a variety of different applications or systems. Accordingly, an operator or a customer service agent may have to coordinate and navigate a variety of different applications, interfaces, and systems to respond to a given issue and communicate the occurrence of the issue and any resolution updates to each impacted party. For example, service agents may have to open, close, and navigate between applications and/or systems depending on whether they want to view a summary of an issue, send communications to notify an impacted party (e.g., customer) with regard to the issue, or manage the resolution process of an issue.

By employing the systems and techniques used herein, a customer service agent may work more efficiently in communicating the occurrence of an issue and/or any resolution updates of ongoing issues to impacted parties through the use of a communications management graphical user interface (GUI) that facilitates issue management communications for issues affecting more than one client, party, or organization. Thus, in one embodiment, the communications management GUI (e.g., the unified issue management window described herein) provides a service agent with a set of tools used to manage communications with two or more customers or client instances as well as the resolution processes for an issue in common between the two or more impacted client instances. For example, the communications management GUI enables the association of individual cases (e.g., individual issues or child cases) for each impacted client instance with a major case (e.g., an issue with at least one underlying cause in common between two or more impacted client instances). Thus, a customer service agent may work to resolve an ongoing major case, and any resolution actions applied to the major case may percolate to each child case associated with the major case.

Additionally, the customer service agent may send communications with regard to the occurrence of a major case and/or any resolution updates to the major case, and corresponding communications will be sent to each impacted client instance associated with the major case via the communications management GUI for the major case. For instance, when a service agent brings a major case to resolution, the service agent may issue a communication describing the resolution or closure of the major case. The communications management GUI for the major case may then send each impacted client instance associated with the major case a communication regarding the resolution of the corresponding issue. In some embodiments, the communications management GUI for the child case of each impacted client instance will display the communication.

With the preceding in mind, the following figures relate to various types of generalized system architectures or configurations that may be employed to provide services to a client in a multi-instance framework that in turn might be subject to issues as discussed herein. Correspondingly, these system and platform examples may also relate to systems and platforms on which the techniques discussed herein may be implemented to facilitate issue resolution. With this in mind, FIG. 1 is a block diagram of a system 100 that utilizes distributed computing and that may be used in conjunction with the approaches discussed herein for providing customer service. As illustrated, one or more clients 102 communicate with a platform 104 (e.g., a cloud service) over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices.

The platform 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication protocols and mechanisms for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only four clients 102 are shown connected to the platform 104 in the depicted example, it should be noted that platform 104 may connect to any number of clients (e.g., tens, hundreds, thousands, or tens of thousands of clients) and may do so via one or many separate computing instances, as discussed in greater detail below.

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The DB 108 includes a series of tables containing information used by applications utilized or run by the clients 102. Additional to or in place of the DB 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely.

Access to the platform 104 is enabled by a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

Figure 2:
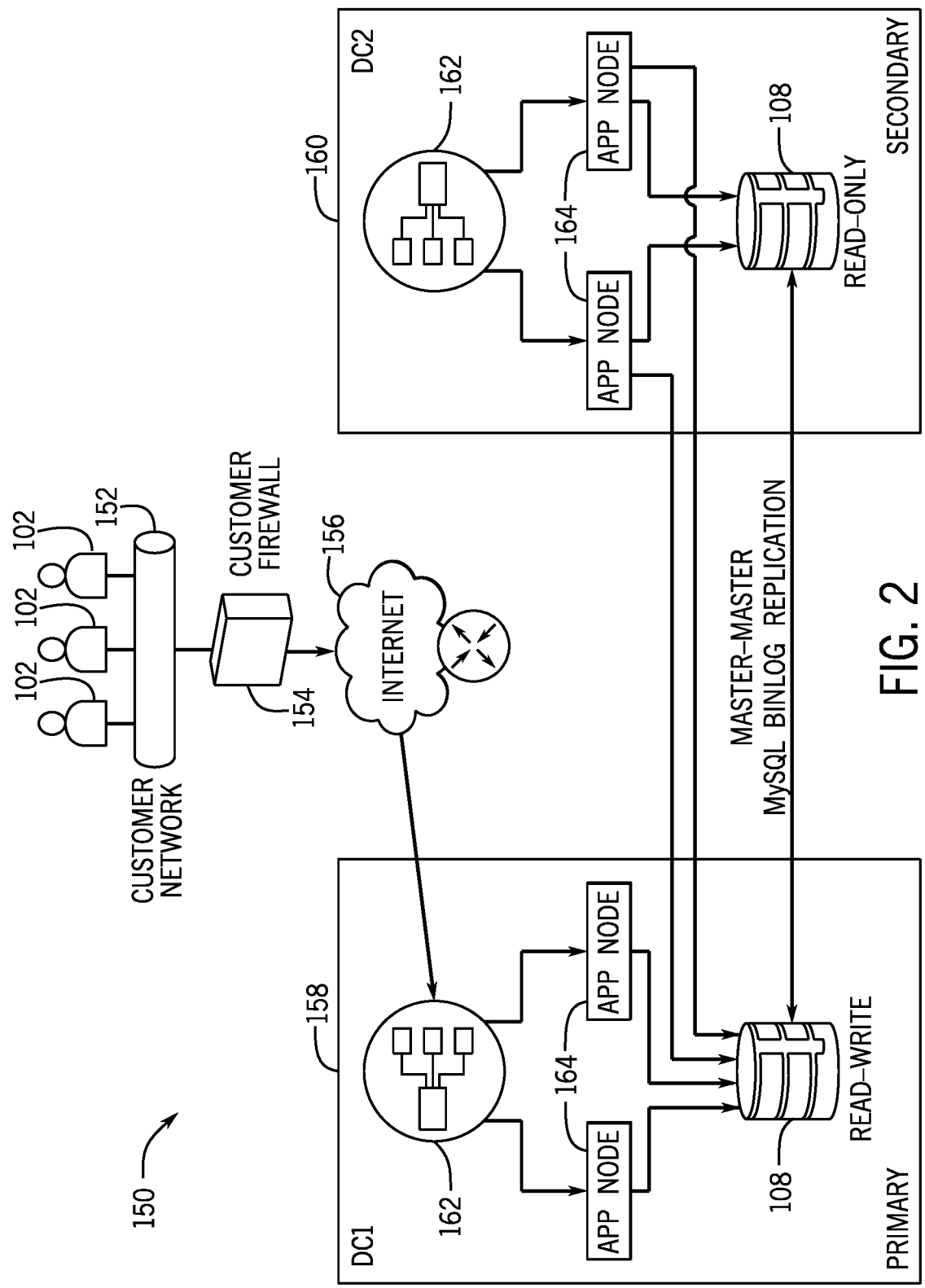
FIG. 2 is a schematic of an embodiment of a multi-instance architecture that may be used in conjunction with a distributed computing system, in accordance with aspects of the present approach.

FIG. 2 is a schematic of an embodiment of a multi-instance architecture 150 that may be utilized by or with the distributed computing system 100 of FIG. 1. As shown, one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a DB 108. In the illustrated embodiment, the database 108 of the primary virtual machine 158 is read-write and the database 108 of the secondary virtual machine 160 is read-only. The databases 108 are replicated via My SQL binlog replication for near real-time replication between the primary database 108 and the secondary database 108. As shown, the application nodes 164 of the primary virtual machine 158 may access the primary database 108, while the applications nodes 164 of the secondary virtual machine 160 may access both the primary database 108 and the secondary database.

Different organizations or entities may have their own dedicated virtual machine or machines 158, 160 and database processes. The multi-instance architecture 150 results in full instance redundancy for all production instances with near real-time replication and no commingling of data.

Figure 3:
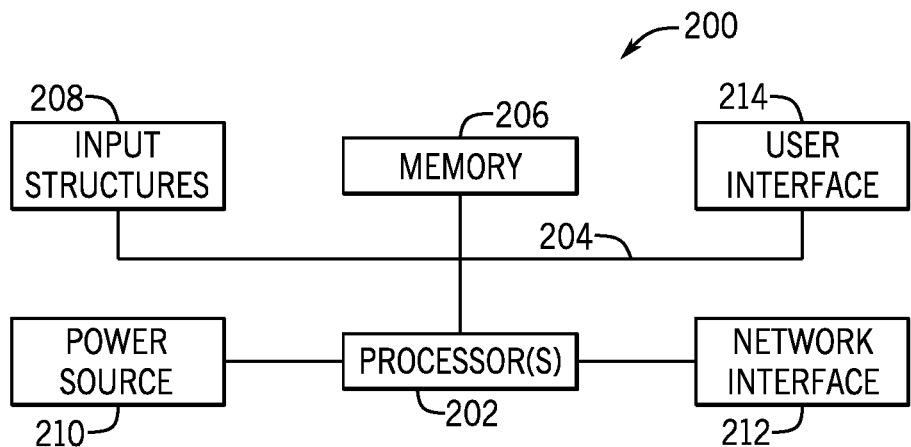
FIG. 3 is a block diagram of an embodiment of a computing device utilized in a distributed computing system, in accordance with aspects of the present approach.

FIG. 3 generally illustrates a block diagram of an embodiment of an internal configuration of a computing device 200. With respect to FIGS. 1-3, the computing device 200 may be an embodiment of the client 102, the application server 107, hardware underlying or supporting a virtual machine 158, 160, a database server (e.g., DB 108), other servers in the platform 104 (e.g., server hosting the communication channel 128), and/or a device running the server 126. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein with or without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly-accessible memory (RAM), disk drives, solid state drives, external flash memory, or any combination thereof. Although shown as a single block in FIG. 3, the memory 206 can be implemented using multiple physical units in one or more physical locations. The one or more processors 202 access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may also monitor operating conditions (e.g., temperatures) of various components of the computing device 200, such as the one or more processors 202, which may be relevant in issue evaluation or resolution as discussed herein.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired and/or wireless network interface. Moreover, the computing device 200 may communicate with other devices via the network interface 212 using one or more network protocol.

A user interface 214 may include a display that is configured to display images transferred to it from the one or more processors 202. In addition to and/or alternative to the display, the user interface 214 may include other devices for interfacing with a user or client. For example, the user interface 214 may include lights (e.g., LEDs), speakers, haptic feedback, and the like.

As discussed herein, the devices and architectures described above may constitute platforms or systems on which an issue (e.g., an incident, an outage, such as an unplanned crash of a data center or planned down time of a data center to provide an update or system maintenance, a defect, such as a product bug, software defect, or network communication defect, a problem, such as a product recall, or anything else that impacts two or more client instances) and/or issue resolution process may occur.

Figure 4:
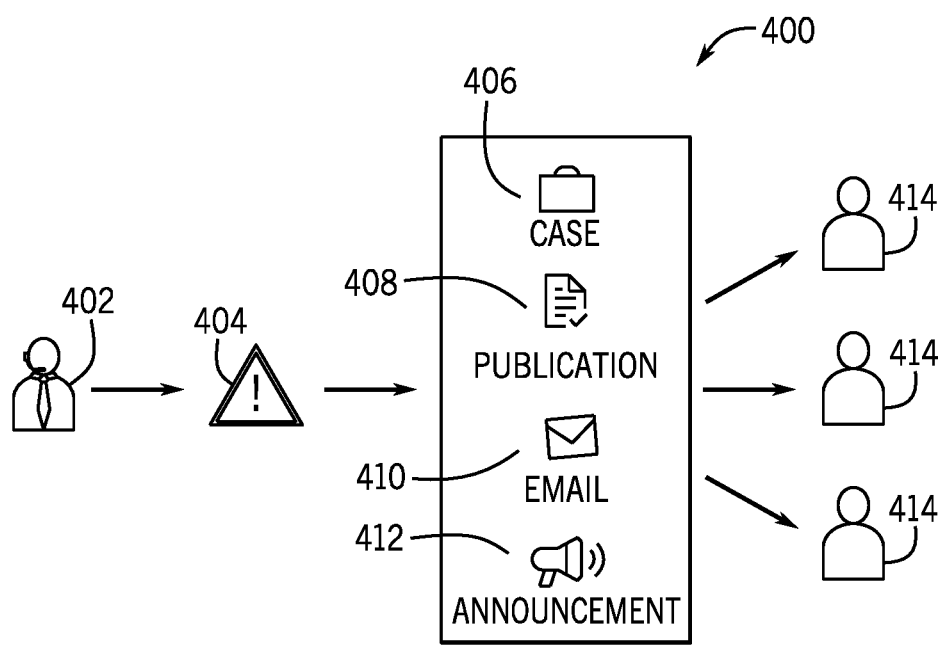
FIG. 4 is a flow diagram of an embodiment of several communication channels available to a customer service agent through a communications management graphical user interface (GUI), in accordance with aspects of the present approach.

With the preceding in mind, FIG. 4 is flow diagram 400 of a general communications management process a customer service agent 402 may initiate with regard to a particular issue 404. Several communication channels 406, 408, 410, 412 may be available to a customer service agent 402 through a communications management graphical user interface (GUI) to send notifications regarding a major case (e.g., issue) 404 to one or more client instances 414.

As used herein, a major case is any issue that impacts two or more client instances with a common underlying cause. A major case may be created reactively from an existing case (e.g., issue) in the communications management GUI by promoting an existing case to a major case. For example, a case (e.g., an information technology service management (ITSM) case) may be created when a customer reports an issue. The case may be promoted to a major case when the issue is identified as affecting other customers or client instances in addition to the customer who reported the issue. Thus, the original case (along with any other identified cases with an underlying cause in common) may become a child case associated with the major case. Each child case may be directly associated with a customer or a client instance. Additional child cases may also be associated with the parent case as they are identified, as described herein. In some embodiments, a relationship may be derived between two or more client instances impacted by an issue. The derived relationship may then be utilized to identify any additional client instances impacted by the issue, and a child case may be associated with each additional identified client instance. For example, the derived relationship may include each client instance having the same type of configuration item or asset impacted by the issue.

A major case may also be created proactively through a monitoring system that facilitates the creation of major cases. For example, a monitoring system may issue an alert when an issue occurs. The communications management GUI may receive the alert and automatically create a major case based on the information contained in the alert. Additionally, a major case may be created proactively by pre-defining issues that impact more than one customer or client instance. A predefined issue, for example, may include a software defect or a service outage such as the crash of data center. The predefined issue may also be associated with any underlying devices or configuration items (CI) that may experience or be affected by this type of issue. In this way, a list of impacted client instances that are associated with the affected devices or CIs can automatically be created when an issue occurs, and any later-identified, impacted client instances may be dynamically added to the list as they are identified. The list may then be used to facilitate communication with each of the impacted client instances with regard to the occurrence of the issue or the resolution progress of the issue. Further, the list of impacted client instances may change over time. The list may dynamically update to add or remove certain impacted client instances based on conditions associated with the list. For example, as client instances are identified as having been impacted by an issue, the recipient list may facilitate the creation of child cases (i.e., individual cases associated with the major case) for each newly determined client instance impacted by the issue.

Referring back to FIG. 4, a customer service agent 402 may identify an issue 404 that impacts two or more customers 414 and/or client instances 414. The customer service agent 402 may manually create a list of customers and/or client instances 414 impacted by the issue 404. In some embodiments, the list of customers or client instances may dynamically be created once an issue occurs, as described herein. The customer service agent 402 may then create child cases for each of the customers and/or client instances within the recipient list. In some embodiments, the child cases may automatically be created from the recipient list. For example, as a client instance is added to the recipient list, a child case may automatically be created for the client instance. In another example, the customer service agent 402 may generate one or more child cases by selecting an option via the communications management GUI to create child cases based on the recipient list.

The customer service agent may then communicate with the client instances 414 within the identified list through a communications management GUI of the major case 404. For example, the customer service agent 402 may notify each impacted customer 414 of the occurrence of the issue 404 and/or any updates in the resolution process of the issue 404. Additionally, any updates made to any attributes of the major case 404 (e.g., the priority level, the state, the category, the sub-category, the comments, or any combination thereof, among others) may cause the same update to be made to each of the child cases associated with the major case 404.

Additionally, the issue may be a planned issue or an unplanned issue. For example, the issue 404 may be an unplanned issue such as a data center crashing. A customer service agent 402 may identify the customers or the client instances impacted by the crash of the data center and send a notification to each of the customers or the client instances through a communications management GUI of the issue (e.g., major case). In another example, the issue 404 may be a planned issue that has a set start time and a set end time. In some embodiments, the start time and/or the end time of the planned issue is configurable by a customer service agent 402 or other operator. For example, a planned issue may include a planned service outage of a data center to facilitate an update to the software of a data center service provider. In this case, the customers or the client instances impacted by the downtime of the data center may already be known. Thus, a customer service agent may send out a notification warning any customers or any client instances that will be affected by the planned service outage. As described below, the communication channels available to a customer service agent 402 may include communication through a respective case 406 of each customer, a publication 408, an email 410, an announcement 412, or a combination thereof, among others. For example, communication through a respective case 406 of each customer may include communication with a primary contact set for the case 406. The primary contact may be automatically set based on information related to the customer or the client instance associated with the case or manually entered into the communications management GUI. An announcement 412 or a publication 408 may be visible to all contacts associated with a client instance or a customer. An email 410 may also be sent to the primary contact set for a customer or a client instance.

In one embodiment, multiple levels of impact may be identified with respect to an issue. For example, different client instance may be impacted more heavily as a result of a software defect. The respective level of impact for each of these different client instances may be determined and one or more targeted communications may be generated based on the respective level of impact.

Figure 5:
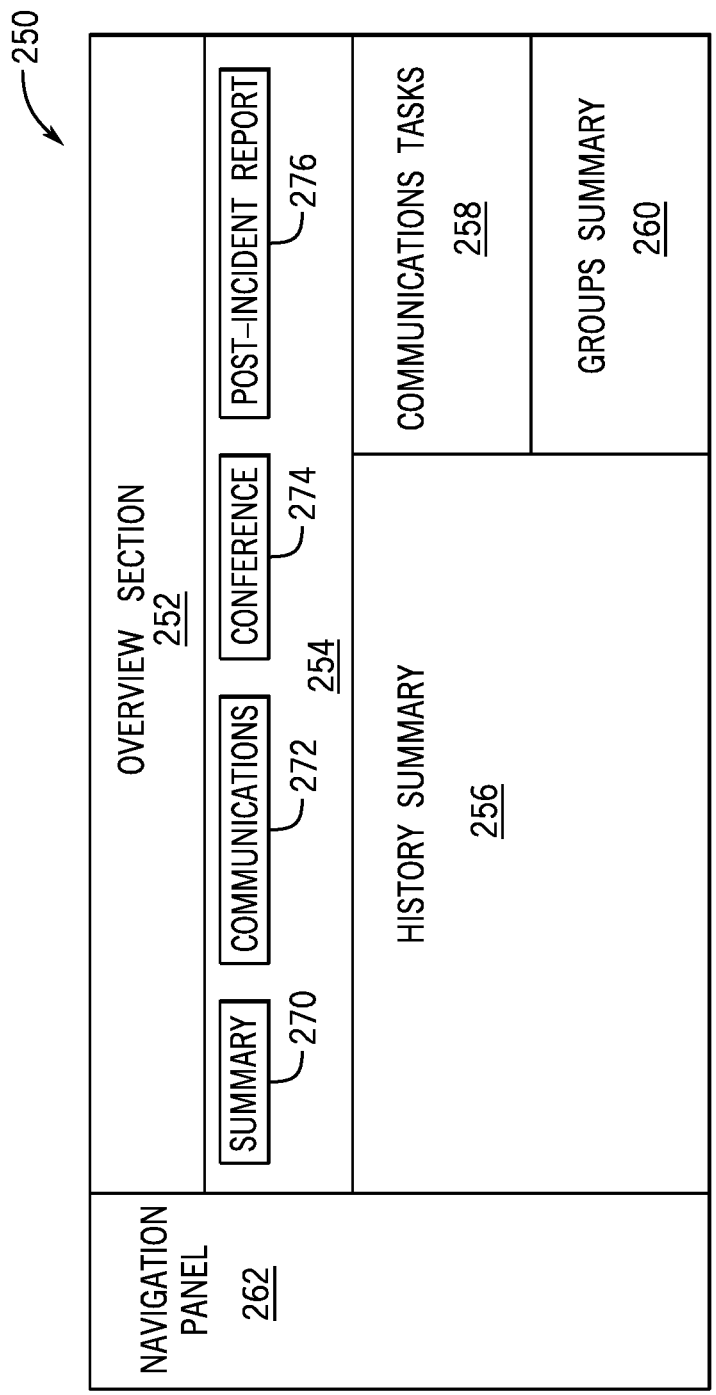
FIG. 5 is an embodiment of the general sections of a unified issue management window used for tracking progress associated with resolving a issue, in accordance with aspects of the present approach.

The customer service agent may engage with a unified issue management window (e.g., a communications management graphical user interface), as described herein, before, during, and after resolving a major case. FIG. 5 is an example of the general sections of a unified issue management window 250 used for tracking progress associated with resolving an issue. The user interface may, in one embodiment, present the unified issue management window 250 as a browser window. Accordingly, the depicted embodiment of the general sections of the unified issue management window 250 is presented as a view of a screen or display illustrating one possible arrangement of various features on a display of a computing device. However, the arrangement of the various features, organized into specific sections, is not limited to the embodiment depicted, since the various features can occupy other positions on the display of the computing device. Accordingly, the illustrated sections may be otherwise positioned on the display. Moreover, it should be noted, that the embodiment depicted in FIG. 5 is meant to introduce the reader to the different possible sections (e.g., portions) of the unified management window 250. For example, the depicted unified management window 250 includes an overview section 252, an impact summary section 254, a history summary section 256, a communication tasks section 258, a groups summary section 260, and a navigation panel 262. As may be appreciated the presence or absence of one or more of these sections as well as their position or layout on the screen may vary depending on implementation and/or may be configurable by a user.

In one embodiment, the overview section 252 may provide a service agent with a high level overview of the major issue (e.g., major case). For example, the overview section 252 may provide a status identifier for indicating whether the issue is a major issue or a major case (as compared to a child case or individual issue). The overview section 252 may also include a status changing selectable prompt, such that the status changing selectable prompt may enable the service agent to change the status of the issue from an issue candidate to an issue or to a resolved issue.

The impact summary section 254 may enable the service agent to select between a summary feature 270, a communications feature 272, a conference feature 274, and a post issue report 276, as described in detail below. It should be noted that the summary feature 270, the communications feature 272, the conference feature 274, and the post issue report 276 may each be selected from the same screen of the unified issue management window 250, such as via a tabbed navigation feature. In one embodiment, the summary feature 270 presents the service agent with an overview of the issue. For example, the summary feature 270 may include an overview of the child cases (e.g., individual issues) associated with the major case (e.g., issue), the customers impacted by the major case, the configuration items (CIs) affected by or affecting the major case, the assets affected by the major case, or other information, as discussed in detail below. Furthermore, the communications feature 272, when selected, may present configuration and implementation features for issuing communications or messages related to an issue. The conference feature 274, when selected, may enable a service agent to initiate or manage one or more conference calls and/or participate in the conference with technical personnel (e.g., to resolve an issue). The post issue report 276 provides information associated with an issue after it has been resolved, such as for a post-mortem review or analysis.

The history summary section 256 may include activities and work notes posted by personnel working on resolving an issue. The activities and work notes may be presented in chronological order (e.g., the most recent activities and work notes above the older activities and work notes) or reverse chronological order. In addition, the history summary section 256 may enable the service agent to post a new work or activity note. Further, the history summary section 256 may enable the customer service agent to manage and edit communication updates (e.g., with technical personnel). For example, a service agent may establish a communication plan to send periodic messages to certain recipients.

The communication tasks section 258 may provide an option to view prior, current, or pending communication tasks and/or to view conference calls (e.g., with other technical personnel). The communication tasks section 258 may further enable the service agent to initiate and manage communication tasks with certain personnel. The groups summary section 260 may present a list of the active groups and the members (e.g., technical personnel) of those groups working to resolve the issue. The groups summary section may be divided into active groups (e.g., the groups currently logged on and trying to resolve the issue 222) and on-call groups (e.g., groups that may be contacted at any time for assistance), such that the service agent may select, via the unified interface, between the active groups and the on-call groups.

The navigation panel 262 may present the service agent with a variety of selectable options to facilitate navigating through the unified issue management window 250. For example, the navigation panel 262 may enable the service agent to access any major cases, any child cases, and/or any resolved cases. Additionally, the navigation panel 262 may enable the service agent to create, edit, or delete one or more recipient lists of a communication, as described herein. Further, the navigation panel 262 may enable the service agent to access various reports, services, and the like.

Figure 6:
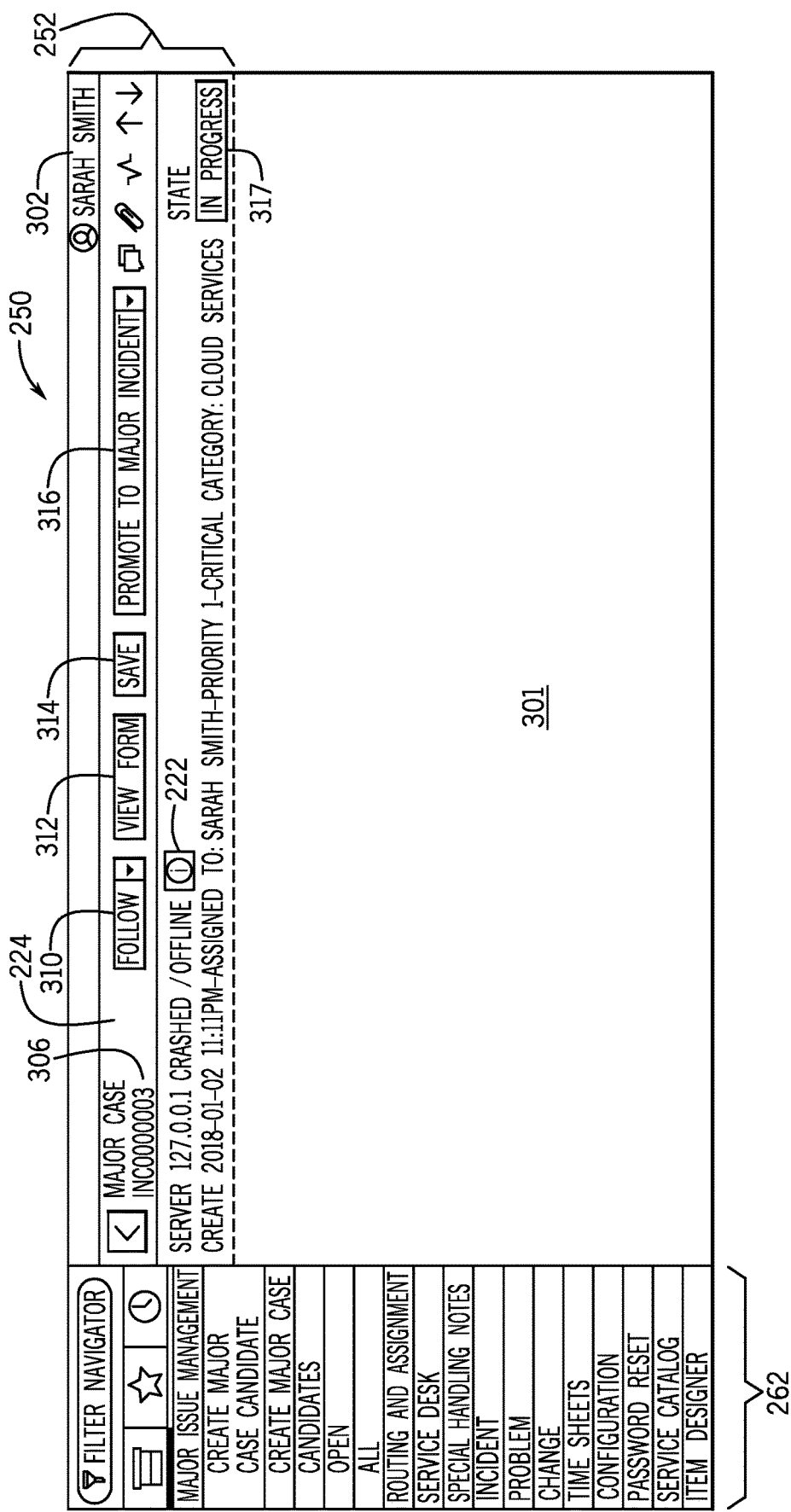
FIG. 6 is an embodiment of the overview section and the navigation panel of the unified issue management window of FIG. 5, in accordance with aspects of the present approach.

FIG. 6 is an embodiment of the overview section 252 and the navigation panel 262 of the unified issue management window 250 of FIG. 5. To facilitate discussion, the impact summary section 254, the history summary section 256, the communication tasks section 258, and the groups summary section 260 of the unified issue management window 250 are discussed in greater detail in later figures but are omitted in FIG. 6 to simplify the presented material. With the preceding in mind, a service agent 302 (e.g., "Sarah Smith" in this example) may be logged into the unified issue management window 250. In some instances, the service agent 302 may be required to provide login credentials (e.g., a password) to access the unified issue management window 250.

The depicted unified issue management window 250 also includes an overview section 252 that includes an issue number 306, in this example, "INC000003," associated with a major issue (e.g., major case) 224 or a child issue (e.g., individual issue or individual case) 224. In the depicted embodiment, the overview section 252 further includes a follow option 310, which, when selected, may enable the service agent 302 to associate the major case 224 with their user profile, for example, to more easily access the major case 224 in the future. Further, in the depicted embodiment, the overview section 252 includes a save prompt 314, which, when selected, enables the service agent 302 to save any modifications they may have made to the unified issue management window 250 of the major issue 224. The overview section 252 may include a prompt 316 to promote (the individual issue 224) to a major case or to designate the major case 224 as a resolved case. Furthermore, the overview section 252 may include a brief description of the major case 222 to be resolved. The issue or the major case, in this example "Server 127.0.0.1 crashed/offline," and associated information may be depicted on the overview section 252. For example, the information 222 associated with the major case 224 may include the date and time created (e.g., "Created: 2018-01-02; 11:11 pm"), the service agent (e.g., "Assigned to Sarah Smith") assigned the major case 222, a level of priority (e.g., Priority 1), severity of the major case 224 (e.g., Critical), the relevant category (e.g., Cloud Services), or any combination thereof, among other associated information.

The overview section 252 may also include a prompt 317 to progress the major case 224 or individual issue 224 to the next state in the issue. For example, a planned service outage lifecycle may progress from a "New" state, to a "Planned" state, to an "In-Progress" state, and to a "Closed" state. In another example, an unplanned service outage lifecycle may progress from a "New" state, to an "In-Progress" state, and to a "Closed" state. Alternatively, a planned or unplanned service outage lifecycle may progress from a "New" state to a "Cancelled" state. Each state of each issue 224 may define permissible actions, as further described below, that may be taken by a customer service agent with respect to each issue 224. For example, if the issue 224 is in a "New" state, a customer service agent may change the definition of an outage, regenerate a list of impacted customers or client instances, start a planned outage, or schedule a planned outage. In another example, if the issue 224 is in a "Planned" state, a customer service agent may start a planned outage, initiate a communication to the list of impacted customers or client instances, or cancel an outage. In another example, if the issue 224 is in an "In-Progress" state, a customer service agent may close an outage or initiate a communication to the list of impacted customers or client instances. Although only five states of a respective issue or outage is described, it should be appreciated that the lifecycle of each issue or outage may include more or less states, and have overlapping or additional definitions and allowable actions.

Referring back to FIG. 6, the overview section 252 may also include a search option, such that the logged-in service agent 302, may search for certain characters (e.g., text) on the unified issue management window 250. Additionally, the overview section 252 may enable the service agent 302 to initiate an instant message (IM), for example, with another service agent; may enable the service agent 302 to access a frequently asked (FAQs) tab, for example, to provide assistance in navigating the unified issue management window 250; and may enable the service agent 302 to access system preferences, such that the service agent 302 may edit certain aspects of their profile, such as their contact information, password, and the like, within the unified issue management window 250. Although in the depicted embodiment, the overview section 252 is positioned at the top of the unified issue management window 250, it should be noted that the overview section 252 and any of its prompts may be positioned at any suitable location on the unified issue management window 250 (e.g., at the middle, at the bottom, at a corner). Furthermore, additional prompts may be included in the overview section 252, and certain prompts discussed above may be omitted from the unified issue management window 250.

The unified issue management window 250 may include the navigation panel 262, which may present the service agent 302 with a variety of selectable options. For example, the navigation panel 262 may include selectable options that may enable the service agent 302 to create a major case or a major case candidate and access a list of issue candidates, a list of open issues, and a list of all issues. Further, the navigation panel 262 may enable the service agent 302 to access various reports, services, applications, or other features to facilitate resolution of the issue 222.

Figure 7:
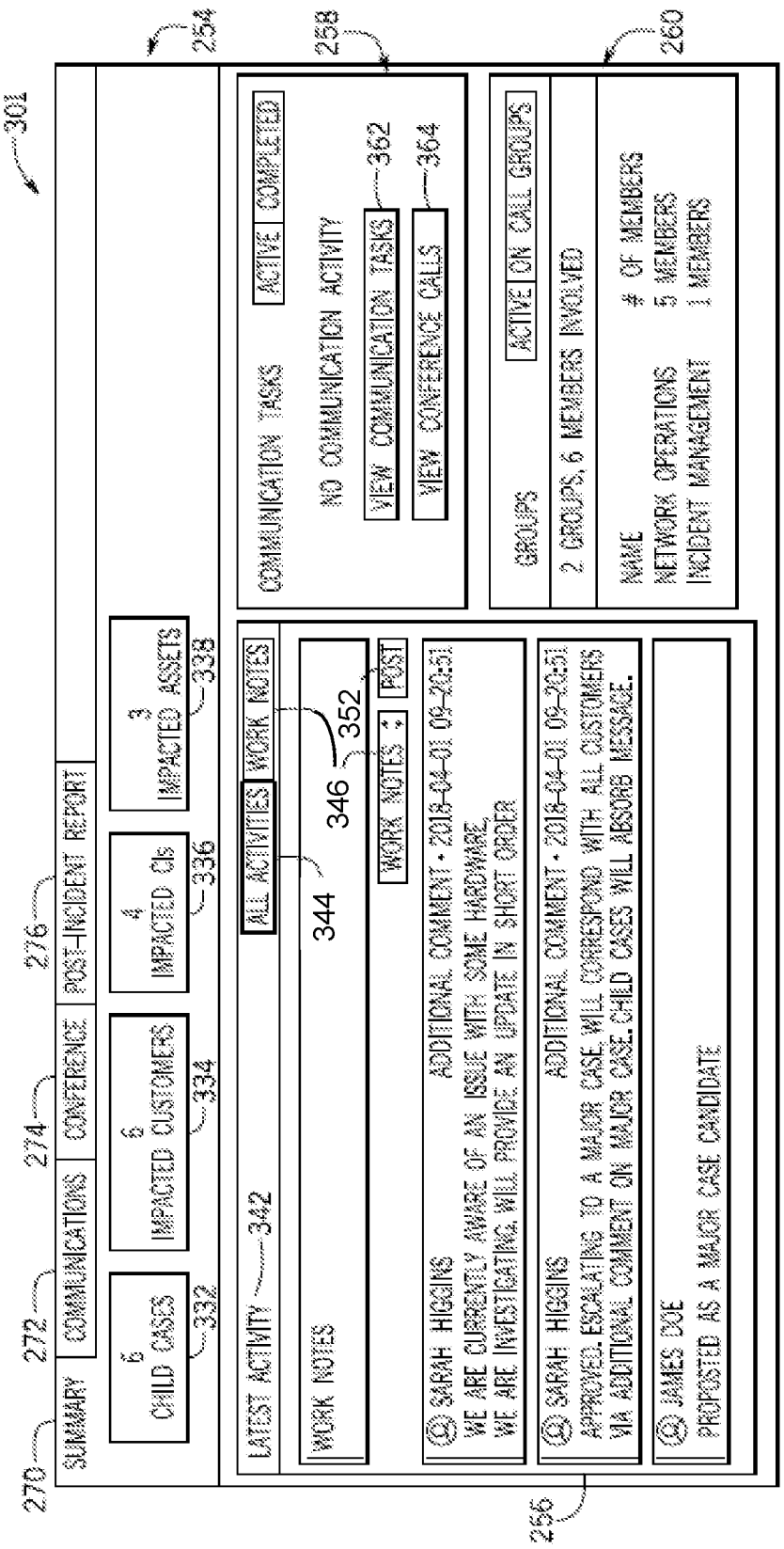
FIG. 7 is an embodiment of a portion of the unified issue management window of FIG. 5 when a summary feature is selected, in accordance with aspects of the present approach.

Turning to FIG. 7, the remaining portions of one implementation of the unified issue management (e.g., communications management GUI) window 250 are depicted. In this example, an embodiment of a portion of the unified issue management window 250 is shown when the summary feature 270 is selected. In some instances, when the service agent accesses (e.g., or logs into) the unified issue management window 250, the service agent may be presented with the summary feature 270 pre-selected. The summary feature 270 may be included in a box, as depicted, to indicate that the summary feature 270 is selected and that summary feature information is being presented. However, it should be noted that any suitable visual indication (e.g., underlined, font change, highlighted) may be used to indicate that the summary feature 270 is selected. The summary feature 270 may present an overview of the issue candidate in the impact summary section 254. For example, the summary feature 270, when selected, may present the impact summary section 254, which in the depicted example includes respective widgets that dynamically monitor and display the number of child cases 332 (e.g., six child cases) associated with the major case 224, the number of impacted customers and/or impacted client instances 334 (e.g., six impacted customers), the number of impacted CIs 336 (e.g., four CIs), and the number of impacted assets 338 (e.g., three impacted assets).

Furthermore, when the summary feature 270 is selected, the unified issue management window 250 may include latest activity 342 in the history summary section 256. As illustrated, the history summary section 256 may include "All Activities" 344 or "Work Notes" 346, depending on whether the option to display "All Activities" 344 or to display "Work Notes" 346 is selected. For example, in the depicted embodiment, the latest activity 342 includes a work note from James Doe, such that the work note from James Doe proposed the case become a "Major Case Candidate" and the work note displays a time stamp (e.g., 2018-04-01 08:12:51) at which the work note from James Doe was generated. Additionally, in the depicted embodiment, the latest activity 342 includes a work note from Sarah Higgins, which approved the proposal by James Doe to promote the case to a "Major Case." Further, in the depicted embodiments, the latest activity 342 includes an additional comment from Sarah Higgins, which sent a communication or a correspondence to each of the child cases associated with the major case stating, "We are currently aware of an issue with some hardware we are investigating. Will provide an update in short order."

When the summary feature 270 is selected, the unified issue management window 250 may enable the service agent to post a new work note by inputting a brief description into the work note prompt 348, scrolling through the drop-down menu 350 to designate whether to post the new work note to "All Activities" 344 or "Work Notes" 346 upon selecting the "post" selection 352.

Additionally, when the summary feature 270 is selected, the unified issue management window 250 may include the communication tasks section 258, which may present the service agent a selectable view communication tasks tab 362 and a selectable view conference calls tab 364. In response to the service agent selecting the selectable view communication tasks tab 362, the unified issue management window 250 may present the service agent with the communication tasks associated with the issue, as described below. In response to the service agent selecting the selectable view conference calls tab 364, the unified issue management window 250 may allow the service agent to initiate or manage conference calls with technical personnel tasked with resolving the issue, as described below. It should be noted that the unified issue management window 250 may also enable the service agent 302 to access the communications tasks by selecting the communications feature 272.

Additionally, when the summary feature 270 is selected, the unified issue management window 250 may include the groups summary section 260. In this example, the groups summary section 260 includes the groups (e.g., two groups) and members (e.g., six members) of those groups involved in attempting to resolve the issue 222. In some instances, the groups summary section 260 includes the names of the groups and the number of members assigned to each of the groups. In this example, the groups summary section 260 may include that a first group named "Network Operations" includes five members and a second group named "Incident Management" includes one member. Furthermore, the groups summary section 260 may be divided into active groups (e.g., the groups currently logged on and trying to resolve the issue 222) and on-call groups (e.g., groups that may be contacted at any time).

FIG. 8 is an embodiment of another portion of the unified issue management window 250 of FIG. 5 when the summary feature 270 of FIG. 7 is selected. Furthermore, the embodiment depicted in FIG. 8 may be presented via the unified issue management window 250 when the service agent scrolls down from the embodiment of FIG. 7. As illustrated, the summary feature, when selected may provide more information associated with the child cases 332. For example, the information associated with the child cases may include the number of cases (e.g., six), the identifier of each child case (e.g., CS00000001), a short description of each child case, the name of the client instance associated with each child case (e.g., Avid Corp.), the name of the primary contact associated with the child case (e.g., James Doe), the name of the service agent assigned to each child case (e.g., Ted Stark), among other suitable data. The unified issue management window 250 may enable the service agent to create or add a new child case 332, such that the new impacted customer 334 is displayed on the unified issue management window 250 after being created or added.

In addition, the summary feature 270, when selected, may provide more information associated with the impacted CIs 336. For example, the information associated with the impacted CIs 336 may include the number (e.g., four) of impacted CIs 336, a name of each of the impacted CIs 336, the class of each of the impacted CIs 336, the organization criticality of each of the impacted CIs 336, the operational status of each of the impacted CIs 336 or any combination thereof, among other suitable information associated with the impacted CIs 334.

The summary feature 270, when selected, may provide more information associated with the impacted customers 334. For example, the information associated with the impacted customers 334 may include the number (e.g., six) of impacted customers 334, an identification number of each of the impacted customers 334, a client instance name of each of the impacted customers 334, the name of the primary contact of each of the impacted customers 334, a phone number of each of the impacted customers 334, or any combination thereof, among other information associated with the impacted customers 334. The unified issue management window 250 may enable the service agent to create or add a new impacted customer 334, such that the new impacted customer 334 is displayed on the unified issue management window 250 after being created or added.

The summary feature 270, when selected, may provide more information associated with the impacted assets 338. For example, the information associated with the impacted assets 338 may include the number (e.g., three) of impacted assets 338, a serial number of each of the impacted assets 338, the name of each of the impacted assets 338, the model category of each of the impacted assets 338, a client instance associated with each of the impacted assets 338, or any combination thereof, among others.

Figure 9:
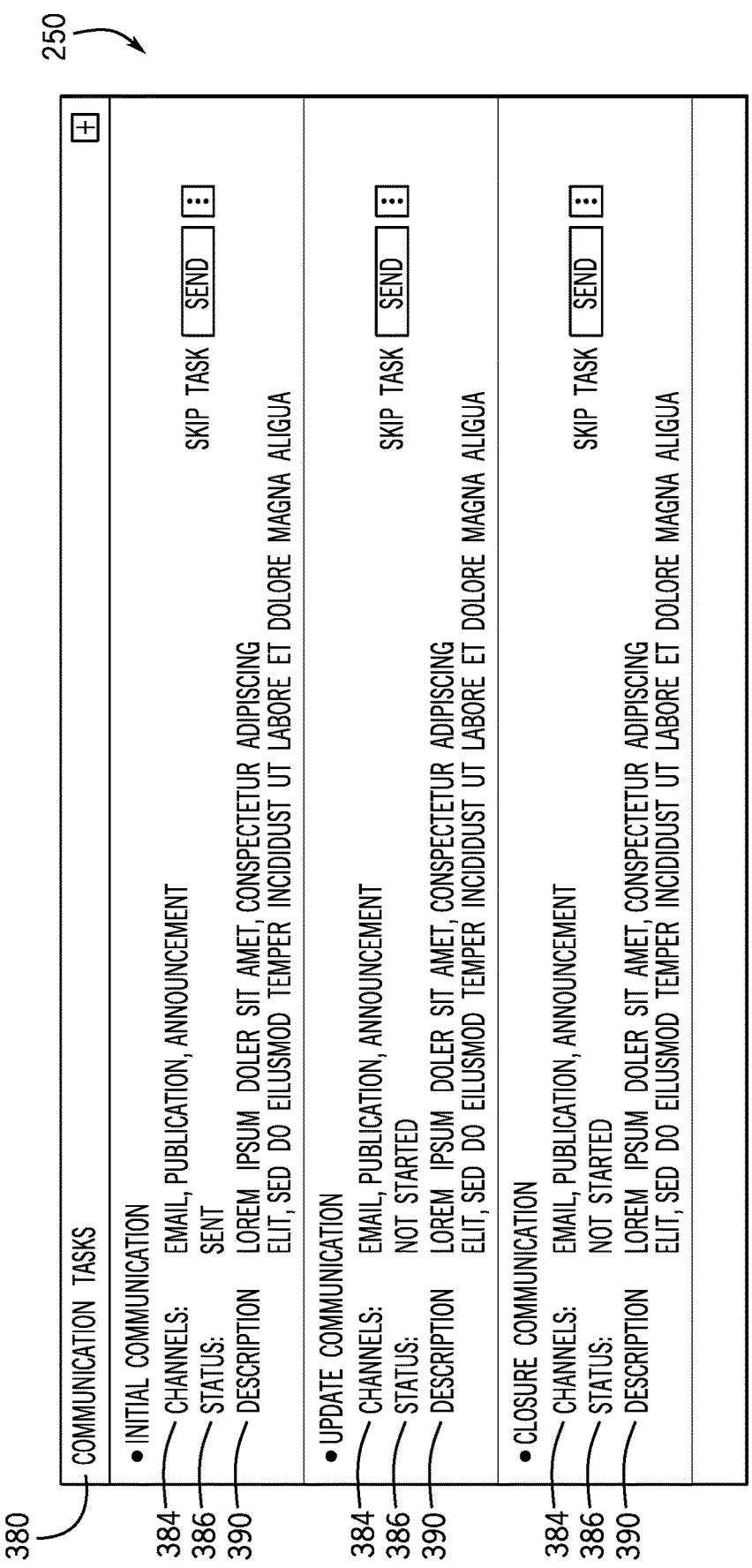
FIG. 9 is an embodiment of a portion of the unified issue management window of FIG. 5 when a communications feature is selected, in accordance with aspects of the present approach.

FIG. 9 is an embodiment of a portion of the unified issue management window 250 of FIG. 5 in which the communications feature 272 (e.g., a communications tab) is selected. The top portion of the unified issue management window has been omitted from the illustrated embodiment to facilitate discussion. However, it should be noted that the top portion 252 and the illustrated portion may be presented, along with the features illustrated in FIG. 9, to the service agent, for example, when the service agent selects the communications feature 272. With the following in mind, the depicted unified issue management window 250 presents the communication tasks section 258, as illustrated, when the communications feature 272 is selected.

The communication tasks section 258 may present communication updates to be provided to the public and/or clients. In the illustrated embodiment, the communication tasks 380 include three communication updates (e.g., "Initial Communication," "Update Communication," and "Closure Communication"). However, it should be noted that the communication tasks 380 may include any number and/or type of communications updates.

The communication updates may include information regarding a channel 384 through which the communication update is to be transmitted. For example, the channel 384 may include e-mail, publication, announcement, SMS, and the like. The communication updates may include information regarding the status 386 of the communication update. For example, the status 386 may indicate that the communication update is "not started," "sent," and the like. Additionally or alternatively, the communication updates may include a completion indication. For example, the completion indication may include a checkmark to indicate that the communication update has been completed, or the completion indication may include a blank circle to indicate that the communication update has not started. Alternatively, the completion indication may include any suitable indication to indicate that the communication update is in progress, overdue, pending, and the like. Furthermore, the communication updates may each include a brief description 390. In some instances, the unified issue management window 250 may enable the service agent to modify or manage the communication updates.

Furthermore, the unified issue management window 250 may also enable the service agent to add a new communication update by selecting a selectable "add" or "+" option. The unified issue management window 250 may also enable the service agent to either skip a communication task by selecting a "skip task" option or send a communication task by selecting a "send" option.

FIG. 10 is an embodiment of a portion of the unified issue management window 250 of FIG. 5, such that a communication task is added to the communications feature 272 of FIG. 9. When the unified issue management window 250 receives a user input to add a new communication task, the unified issue management window 250 may present the service agent with an interface (e.g., the screenshot 420) of the unified issue management window 250 depicted in FIG. 9. The depicted screenshot 420 includes a drop-down menu for selecting a communication plan 422. The communication plan 422 may be a new, existing, or expired communication plan. Furthermore, the screenshot 420 includes a text box for entering a plan name 424 (e.g., "Executive Team Communication"). The screenshot 420 further includes a drop-down menu for adding a recipient 426 intended to be associated with this newly generated communication task. For example, the drop-down menu may include options for specifying the recipient 426 to be a user, client, administrator, customer, client instance, and the like. The unified issue management window 250 may also include a search or text box for further specifying the name of the recipient (e.g., "John Doe"). After the recipient 426 has been added, a recipient list 428 may be propagated. In some instances, the service agent may search a table of recipients and select certain recipients to propagate the recipient list.

In addition, the screenshot 420 includes a text box for specifying the task name 430, in this example, "Executive Team Status Update." The task name may be presented when the communications feature is selected. In addition, the screenshot 420 includes a textbox for enabling a service agent to insert a brief task description 432. The screenshot 420 also includes selectable boxes for indicating, which channels 384 will be used to communicate. While the illustrated embodiment includes boxes (e.g., a box specifying e-mail as the channel, another box specifying announcement as the channel, another box specifying publication as the channel, and another box specifying case as the channel) that can be checked, it should be noted that a service agent may specify channels 384 via any suitable method. Furthermore, the screenshot 420 includes options for specifying the frequency 436 for sending the new communication task to the recipients 426 specified in the recipient list 428. In this example, the service agent may specify whether the new communication task should occur only one time or be recurring (e.g., every 30 minutes or any other suitable period). In this example, after the service agent selects the save option, the new communication task is generated.

Figure 11:
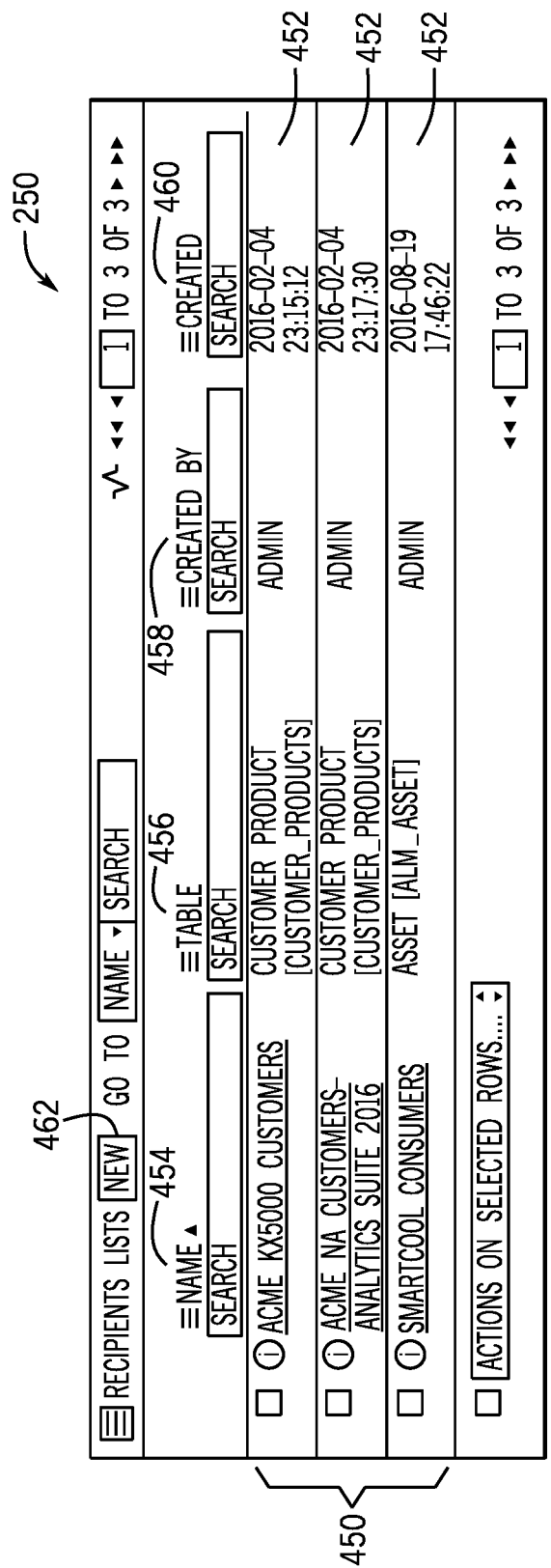
FIG. 11 is an embodiment of the unified issue management window of FIG. 5, whereby a recipient list of an issue may be created or edited, in accordance with aspects of the present approach.

FIG. 11 is an embodiment of a portion of the unified issue management window 250 of FIG. 5, such that one or more recipient lists may be created, edited, or deleted. As described herein, creating a recipient list with one or more conditions that qualifies customers or client instances to be added or removed from the recipient list may increase the efficiency of a customer service agent in communicating with customers and with resolving an issue. For example, as customers or client instances are automatically added to a recipient list of a major case, additional child cases may be created through the updated recipient list by creating child cases associated with only newly added, qualified recipients. Thus, a customer service agent may avoid having to manually create and associate new child cases for each newly identified, impacted customer or client instance.

When the unified issue management window 250 receives a user input to add a new recipient list or edit an existing recipient list, for example, through the navigation panel 262 of FIG. 5, the unified issue management window 250 may present the service agent with an interface of the unified issue management window 250 depicted in FIG. 11. The portion of the unified issue management window 250 of FIG. 11 may present recipient list section 450. The recipient list section may include one or more created recipient lists 452. The recipient list section 450 may also display additional information associated with each recipient list 452. For example, the recipient list section 450 may display the name 454 of each recipient list 452 (e.g., SmartCool Consumers), the type of table 456 associated with each recipient list 452 (e.g., Asset), the name 458 of the user who created each recipient list 452 (e.g., admin), the timestamp 460 of the creation of each recipient list 452 (e.g., "2016-08-19 17:46:22"), or any combination thereof, among others. The unified issue management window of FIG. 11 may also provide one or more text boxes for searching for a particular list of one or more lists displayed in the recipient list section 450.

Figure 12:
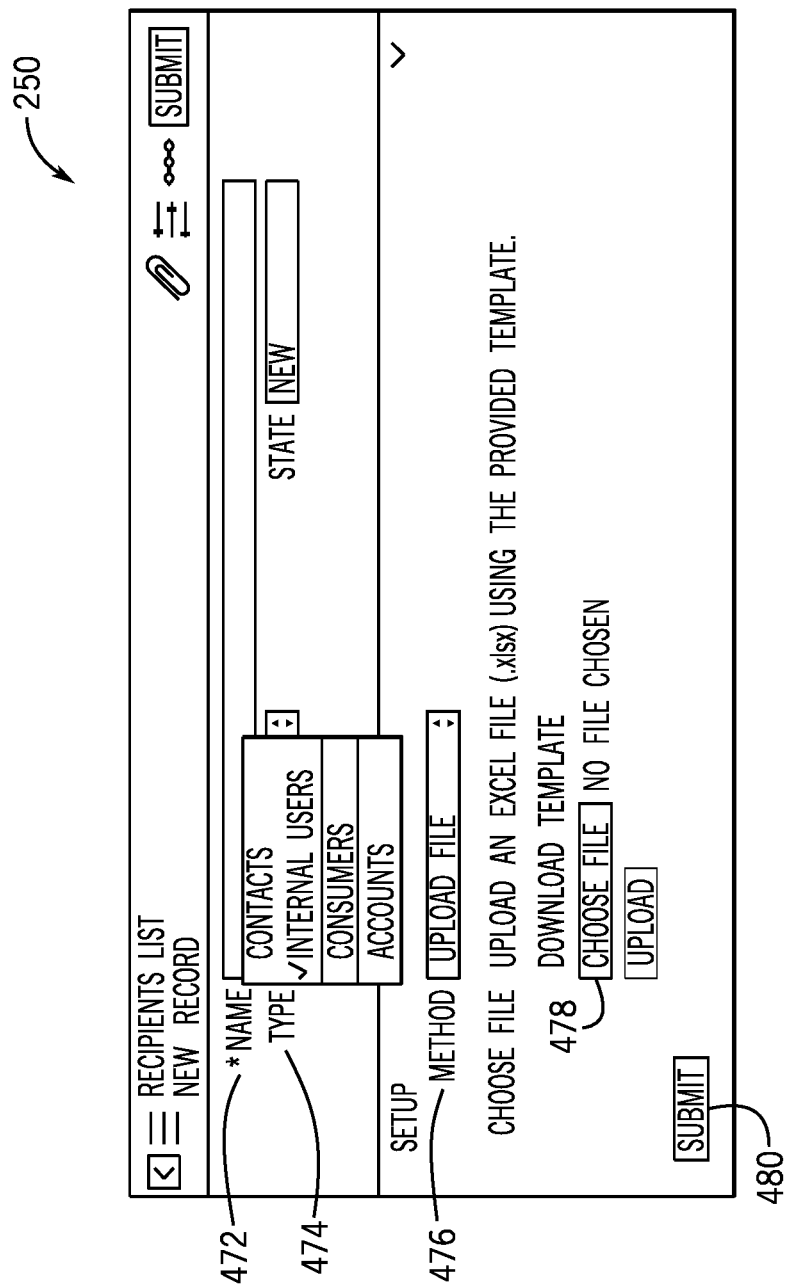
FIG. 12 is an embodiment of the unified issue management window of FIG. 5, whereby a recipient list of an issue may be created, in accordance with aspects of the present approach.

The portion of the unified issue management window 250 of FIG. 11 may also display a selectable option 462 to create a new recipient list. Upon selection of the new recipient list option, the unified issue management window 250 may present the service agent with an interface of the unified issue management window 250 depicted in FIG. 12. The unified issue management window may include a textbox for entering a name 472 of the recipient list. The united issue management window 250 may also include a drop-down menu for selecting the type of recipients 474 within the recipient list (e.g., contacts, internal users, or consumers). Furthermore, the united issue management window may include a drop-down menu 476 for the method of creating the recipient list. For example, upon selection of the "Upload File" option from drop-down menu 476, a file (e.g., an excel file or a text file) may be uploaded using option 478. Once the file has been uploaded, the service agent may select an option 480 to submit the information provided through united issue management window 250 of FIG. 12 and a corresponding recipient list may be created and displayed on the unified issue management window 250 of FIG. 11.

Figure 14:
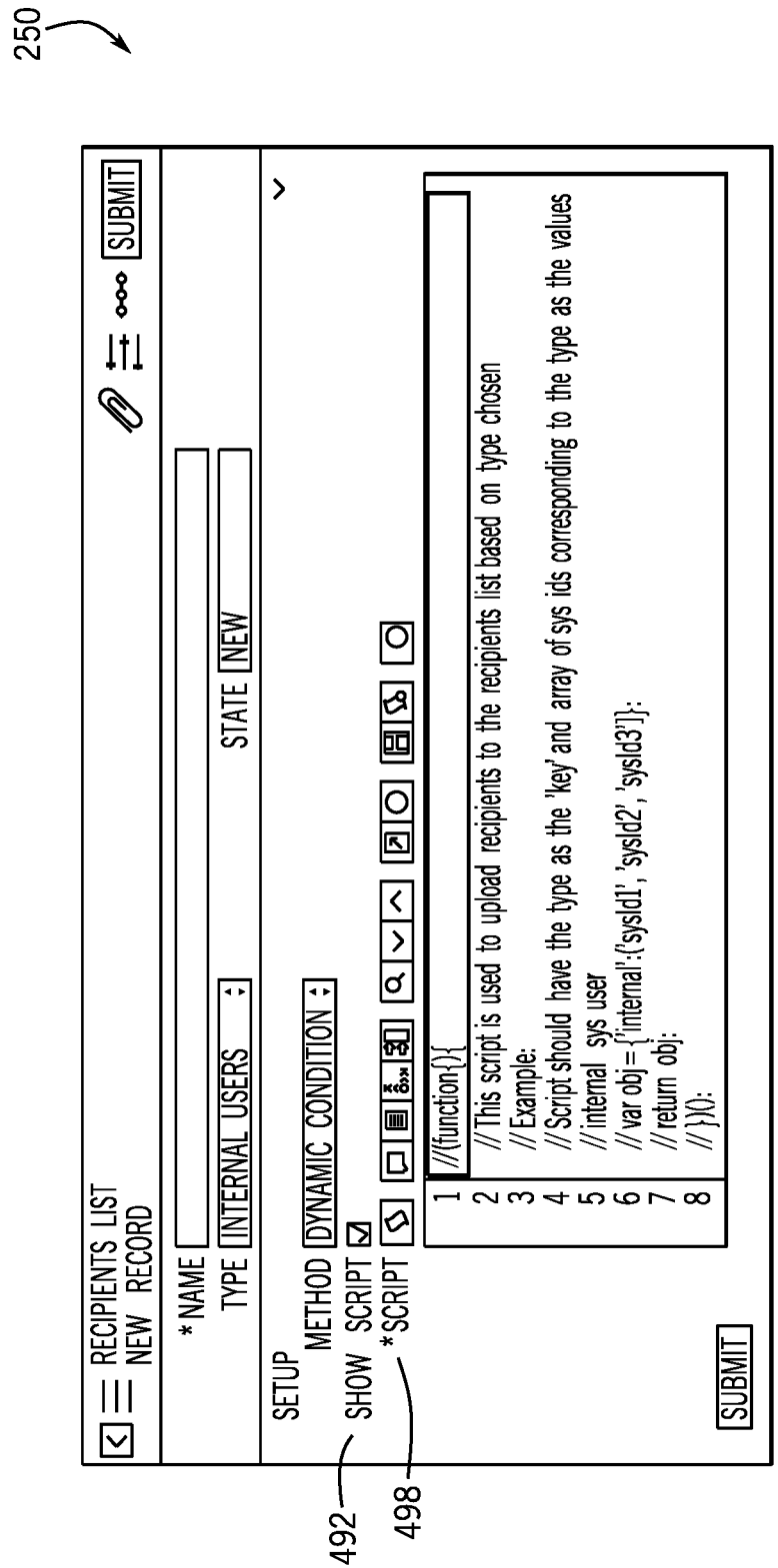
FIG. 14 is an embodiment of the unified issue management window of FIG. 5, whereby a recipient list of an issue may be created, in accordance with aspects of the present approach.

In another embodiment, upon selection of the "Dynamic Condition" option from drop-down menu 476, the unified issue management window 250 may present the service agent with an interface of the unified issue management window 250 of FIG. 13. Upon selection and de-selection of the show script option 490, the service agent may toggle the display of Script section 498 of FIG. 14. For example, upon selection of show script option 490, Script section 498 may be displayed. The service agent may then enter script (e.g., JavaScript, Python, or Ruby) or any suitable language to define conditions that associate specific customers or client instances with the recipient list. The conditions may continue to generate or update the recipient list of customers or client instances over time depending on whether the conditions are fulfilled by each customer or each client instance within the recipient list. For example, upon the crash of a data center, the recipient list may automatically be filled with customers or client instances that possess assets or CIs that are impacted by the data crash. In another example, upon deselection of show script option 492, Script section 498 may be hidden and the unified issue management window 250 of FIG. 13 may be presented to the service agent. The unified issue management window 250 may display a number of drop-down options 494 and/or operator options 496 to allow a customer service agent to create conditions without entering the corresponding script for such conditions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication management system, comprising:
at least one computer, configured to:
determine a root cause of an issue that impacts two or more client instances, wherein each client instance of the two or more client instances is hosted by respective computing architecture of a multi-instance architecture, and wherein at least one resource between each respective computing architecture of the two or more client instances is shared between the two or more client instances;
generate and present a communications management graphical user interface (GUI), comprising a communications portion configured to perform a selectable communication action related to the root cause that impacts the two or more client instances, wherein the selectable communication action is configurable to send one or more communications to each client instance of the two or more client instances;
determine a respective level of impact caused by the root cause to each client instance of the two or more client instances;
generate one or more targeted communications to each client instance based on the respective level of impact caused by the root cause to each client instance; and
send the one or more targeted communications to each client instance in response to a selection of the selectable communication action.

2. The communications management system of claim 1, wherein the at least one computer is configured to:
derive a relationship between the two or more client instances impacted by the issue;
identify an additional client instance impacted by the issue based on the derived relationship; and
generate an information technology service management (ITSM) case associated with the additional client instance.

3. The communications management system of claim 2, wherein the derived relationship includes the two or more client instances being impacted by at least a software defect or a data center crash.

4. The communications management system of claim 1, wherein the selectable communication action is configured to send the one or more targeted communications describing an occurrence of the issue.

5. The communications management system of claim 1, wherein the selectable communication action is configured to send the one or more targeted communications describing a resolution step of the issue.

6. The communications management system of claim 1, wherein the at least one computer is configured to generate and present the communications management GUI, comprising a summary portion configured to display a history of one or more performed communication actions.

7. The communications management system of claim 6, wherein the summary portion is updated to display the one or more targeted communications sent to each client instance in response to a selection of the selectable communication action.

8. The system of claim 1, wherein the communications management GUI indicates at least one or more of: an amount of configuration items associated with the two or more client instances that are impacted by the issue, an amount of assets associated with the two or more client instances that are impacted by the issue, or an amount or extent of the two or more client instances impacted by the issue.

9. A method, comprising:
 determining a root cause of an issue that impacts two or more client instances, wherein each client instance of the two or more client instances is hosted by respective computing architecture of a multi-instance architecture, and wherein at least one resource between each respective computing architecture of the two or more client instances is shared between the two or more client instances;
 presenting a communications management graphical user interface (GUI), comprising a communications portion configured to perform a selectable communication action related to the issue that impacts the two or more client instances, wherein the selectable communication action is configurable to send one or more targeted communications to each client instance of the two or more client instances;
 determining a respective level of impact caused by the root cause to each client instance of the two or more client instances;
 generating one or more targeted communications to each client instance based on the respective level of impact caused to each client instance; and
 sending the one or more targeted communications to each client instance in response to a selection of the selectable communication action.

10. A method, comprising:
 presenting a communications management graphical user interface (GUI), comprising a list management portion configured to create a list to associate with a client instance upon a condition of the list being met by a characteristic of the client instance, and a communications portion configured to perform a selectable communication action related to a root cause of an issue that impacts the client instance;
 receiving an indication of the issue;
 determining the root cause of the issue;
 determining that the condition of the list is met by respective characteristics of two or more client instances, wherein the respective characteristics of the two or more client instances are related to the root cause of the issue, wherein each client instance of the two or more client instances is hosted by respective computing architecture of a multi-instance architecture, and wherein at least one resource between each respective computing architecture of the two or more client instances is shared between the two or more client instances;
 associating the two or more client instances with the list; and
 sending one or more targeted communications to each client instance of the two or more client instances in response to a selection of the selectable communication action.

11. The method of claim 10, wherein the indication of the issue is received from a system configured to detect an occurrence of the issue.

12. The method of claim 10, wherein the list management portion is configured to generate an information technology service management (ITSM) case for each client instance associated with the list.

13. The method of claim 10, comprising:
 determining that the condition of the list is met by a characteristic of an additional client instance; and
 associating the additional client instance with the list.

14. The method of claim 13, comprising generating an additional ITSM case for the additional client instance associated with the list.

15. The method of claim 10, wherein the characteristic of the client instance comprises a configuration item impacted by the root cause or an asset impacted by the root cause.

16. The method of claim 10, wherein the condition is configured to be defined via the list management portion.

17. The method of claim 16, wherein the condition is configured to be defined via a selection of one or more selectable condition options via the list management portion.

18. The method of claim 16, wherein the condition is configured to be defined via a submission of script via the list management portion.

19. The method of claim 10, wherein the one or more targeted communications comprise a description of the occurrence of the issue or a resolution step of the issue.

* * * * *